M. W. DUZEY.
SANDPAPERING MACHINE.
APPLICATION FILED MAR. 2, 1917.

1,240,428.

Patented Sept. 18, 1917.
2 SHEETS—SHEET 1.

Inventor
Michael W. Duzey.
By his Attorney
Oscar Geier

UNITED STATES PATENT OFFICE.

MICHAEL W. DUZEY, OF SEYMOUR, CONNECTICUT, ASSIGNOR OF ONE-HALF TO MIK. KURYLLO, OF SEYMOUR, CONNECTICUT.

SANDPAPERING-MACHINE.

1,240,428.  Specification of Letters Patent.  Patented Sept. 18, 1917.

Application filed March 2, 1917. Serial No. 152,148.

*To all whom it may concern:*

Be it known that I, MICHAEL W. DUZEY, a subject of the Emperor of Austria, resident of Seymour, county of New Haven, and State of Connecticut, have invented certain new and useful Improvements in Sandpapering-Machines, of which the following is a specification.

This invention relates to improvements in manually operated sand-papering implements, and has as its principal object the provision of a device which may be operated by hand in the manner of a carpenter's plane, the same operatively engaging with the surface which it passes in either direction, smoothing the surface by revolving rollers covered by a suitable abrasive material.

A further object is to provide such implements in forms which may be readily handled, which occupy a limited space, and which are effective in their results.

These and other like objects are attained by the novel design, construction, and combination of parts hereafter described and shown in the accompanying drawings, forming a material part of this disclosure, and in which:—

Figure 1:
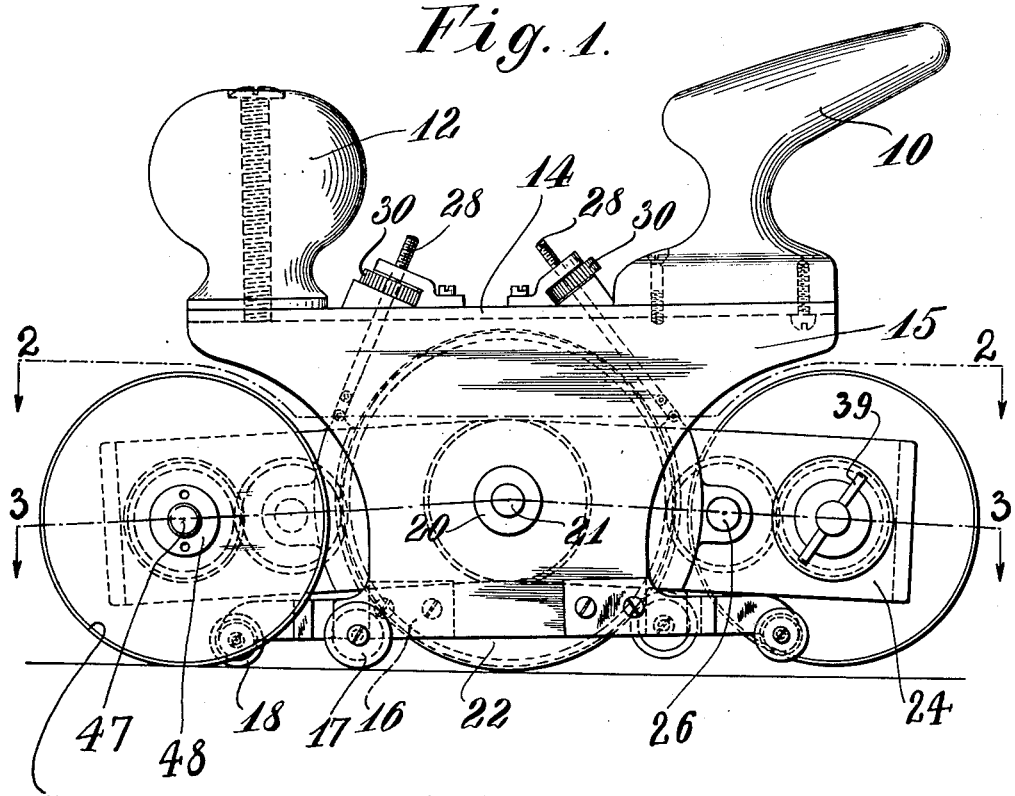
Figure 1 is a side elevational view of a preferred embodiment of the invention.
Figure 2:
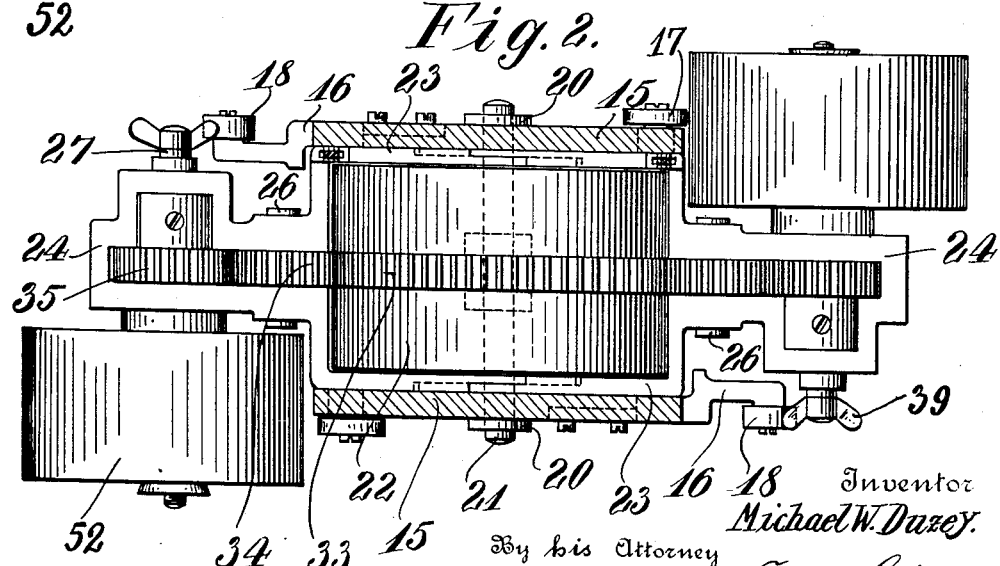
Fig. 2 is a sectional view taken on line 2—2 of Fig. 1.

The implement is comprised of a handle 10 and knob 12, the parts being shaped and operated in all respects similar to those of a plane and are attached at their bottoms to a plate 14, forming the cover of a casing having formed sides 15, at the lower outer corners, and upon opposite sides of which, are brackets 16 mounting rollers 18, similar rollers 17 being carried by the frame sides direct, both being normally in contact with the surface over which the implement is passed, and preventing an undue pressure from being applied to the abrading rollers as will be further apparent.

Centered midway in the frame in bearings 20, is a shaft 21, upon which is mounted a friction roller 22; also carried by the shaft are the hinged ends of inner frames 23, the extending box-like ends 24 of which are brought toward each other, these ends projecting within the frame sides 15 and have shafts 26 and 27 rotatably mounted therein.

The frame 23 is maintained in relative horizontal position to the frame 15 by means of rods 28, arranged in pairs pivotally connected to the frame sides 23, the upper ends of the rods being screw-threaded and pass through the plate 14, where they may be adjusted for height by the nuts 30, thus holding the inner frames 23 firmly in adjusted relation to the outer frame 15.

Rigidly mounted upon the shaft 21, between sections of the roller 22, is a spur gear 33 engaging with pinions 34 rotatable on the shafts 26, transmitting rotation to the spur pinions 35, rigidly mounted upon the hollow shafts 27.

Thus when the roller 22 is pressed firmly against a relatively level surface and the apparatus moved, motion is conveyed to the shafts 27 causing them to rotate in opposite directions.

These hollow shafts 27, which extend outward from their bearings at one end and upon opposite sides of the apparatus, contain spindles 38 clamped by wing nuts 39 and engaged with them are hub or sleeve elements 40 provided with collars 42 adapted to make contact with the respective sides of the frame 23 and with collars 41 formed with spindles 38, so as to prevent lateral motion of the shaft or spindles.

Formed with the other ends of the sleeves 40 are disks 44 to receive the screws 45 by which the abrading rollers are secured.

The outer ends 47 of the spindles 38 are screw-threaded to suit metal cones 48 so that the cones may be drawn toward the disks 44 when the screws are turned relative to the cone.

The cones and sleeves are encircled by a plurality of segments 50 in such manner that the several segments may be forced outwardly as the cone 48 is drawn toward the disk 44, the segments having a curved exterior adapted to engage within an encircling band 52, made of sand-paper or other like abrasive and which is firmly engaged with the disk or roll formed by the segments.

Obviously by retracting the cone 48 the segments may be loosened from the band 52, allowing it to be removed or replaced in a manner which will be clearly evident.

Figure 3:
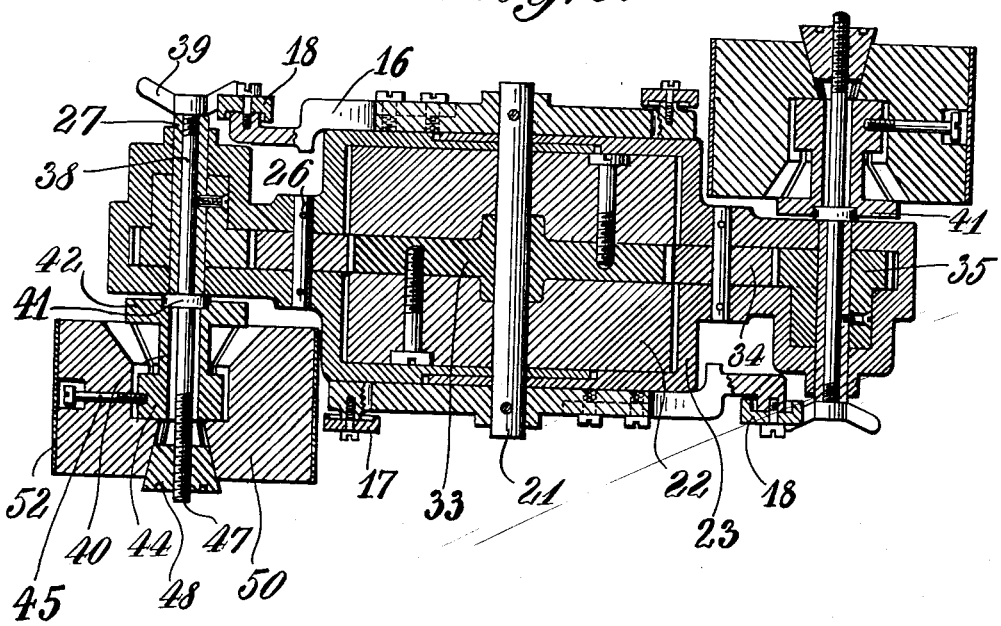
Fig. 3 is a sectional view taken on line 3—3 of Fig. 1.
Figure 4:
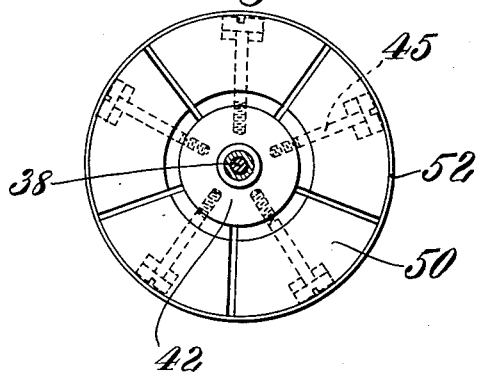
Fig. 4 is a front elevational view showing one of the expansible rollers upon which the abrading band is attached.

In operation, the several segments having been properly mounted upon the sleeve 40 and placed in the position indicated in Fig. 3, the apparatus is ready to be operated by grasping the handle, applying pressure, and at the same time exerting a sliding motion, causing the rollers 22, which are engaged with the surface, to transmit rotative motion through the gears and shafts to the abrading rings 52 mounted upon the segments 50, the apparatus being depressed at one end while moving in one direction and tipped in a reverse direction when moving in the opposite direction.

As the abrading elements are adjacent to the sides of the frame, the apparatus may be operated closely against any upstanding projections from the surface and by reason of the adjusting rods 28, the engagement between the bands 52 of the shafts and surface to be leveled or smoothed may be limited in an obvious manner.

Figure 5:
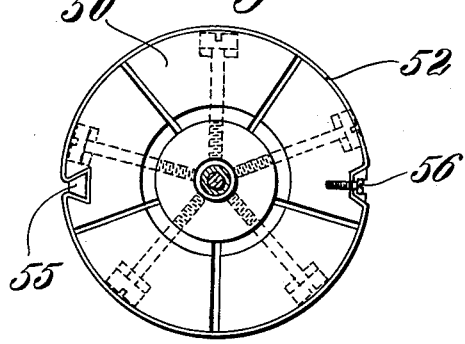
Fig. 5 is a similar view showing a modified form of roller construction.

In Fig. 5 is shown a modification in which the abrasive band 52 is held with relation to the segments 50 either by inserted dove-tailed blocks 55 suited to enter corresponding grooves in the periphery of the segments 50 or which may be held therein by means of screws 56.

Having thus described my invention, what I claim as new, and desire to secure by Letters Patent, is:—

In a manually operated sand papering machine, the combination with a handle, a frame depending therefrom, a roller mounted in said frame adapted to engage with the surface over which the implement is moved, a gear combined with said roller, abrading wheels carried by said frame, a plurality of support rollers upon which the first named frame is mounted, pinions engaged with said abrading rollers, connections between said pinions and said gear whereby said rollers are caused to rotate, and means for raising either of said abrading wheels one independently of the other relative to said frame.

In testimony whereof I have affixed my signature this 23rd day of February, 1917.

MICHAEL W. DUZEY.